United States Patent Office 3,113,759
Patented Dec. 10, 1963

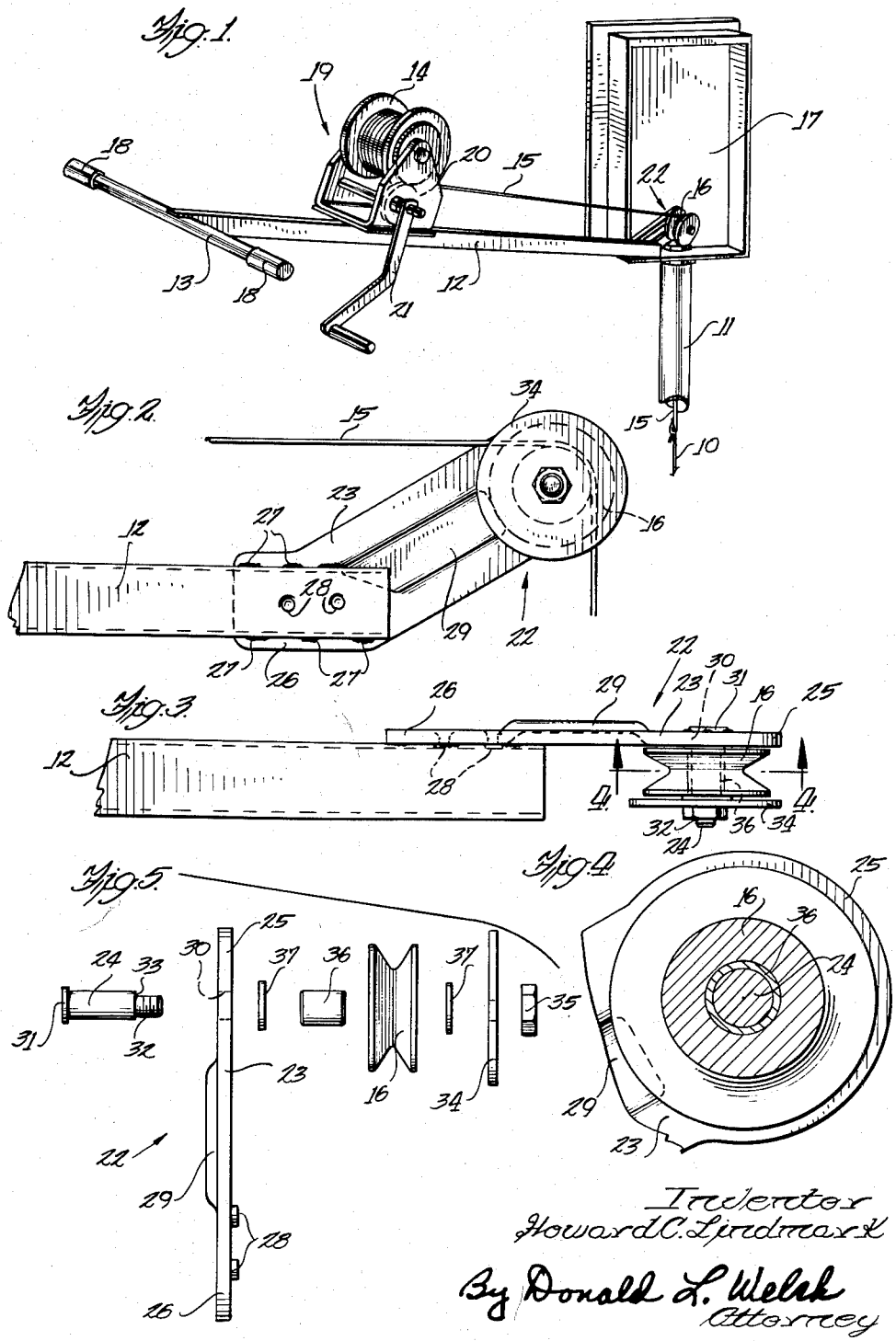

3,113,759
WIRE PULLER
Howard C. Lindmark, 1206 Kishwaukee St.,
Rockford, Ill.
Filed Oct. 23, 1961, Ser. No. 146,806
4 Claims. (Cl. 254—134.3)

This invention relates generally to wire pulling devices of the portable type intended for such uses as pulling electrical cable through conduits to junction or panel boxes. More particularly, the invention relates to a portable wire puller having an elongated frame with a cable winding drum spaced from one end and a pulley supported on that end to receive a cable extending from the drum around either one side or the opposite side of the pulley.

The primary object of the invention is to provide, in a wire puller of the above character, a novel pulley support which is capable of withstanding the substantial forces resulting from tension on the cable and which, at the same time, facilitates changing of the cable position from either side of the pulley to the opposite side.

A more detailed object is to provide a novel cantilever support for the pulley enabling the cable position relative to the pulley to be changed without retracting the cable from the pulley support.

Other objects and advantages of the invention will become apparent from the following detailed description taken in connection with the accompanying drawings in which:

FIG. 1 is a perspective view of a cable puller embodying the novel features of the present invention and shown in working relation to a junction box;

FIG. 2 is a fragmentary side elevational view of the puller showing the pulley and its support;

FIG. 3 is a fragmentary plan view of the parts shown in FIG. 2;

FIG. 4 is a fragmentary enlarged sectional view taken along the line 4—4 of FIG. 3; and FIG. 5 is an exploded plan view of the pulley and its support.

The present invention is shown in the drawings for purposes of illustration embodied in a wire or cable puller of the type especially adapted for use in pulling electrical wiring 10 through a conduit 11. The puller comprises generally an elongated frame 12 having a cross bar 13 at one end acting as a handle and adapted to be braced against the body of the user. A cable winding drum 14 is mounted on the frame intermediate its ends and carries a cable 15 which extends around a pulley 16 mounted at the other end of the frame. In ordinary use, the puller is supported in a horizontal position with the pulley end resting against a part of the junction or panel box 17 into which the wiring 10 is to be drawn. The wiring is connected to the cable and the latter is wound on the drum after being extended around either the top or the bottom of the pulley depending on whether the wiring is to be pulled upwardly or downwardly into the box, the cable in FIGURE 1 extending around the top of the pulley and downwardly into the conduit through which the wiring is to be drawn upwardly.

In the present instance, the frame 12 is a straight piece of hollow tubing of square cross section and the handle 13 is a solid cylindrical bar welded in a perpendicular position across one end of the tubing and having handle grips 18 at its opposite ends. The drum 14 is a part of a winch 19 and is rotatably supported on a U-shaped frame 20 bolted to the upper side of the tubing. A manually operable crank 21 rotatably mounted on the winch frame is connected to the drum through suitable reduction gearing for winding the cable on the drum as the crank is turned. The pulley 16 is rotatably mounted through the medium of a support 22 on the end of the tubing opposite the handle.

To simplify the manufacture and use of the puller, the present invention contemplates a novel construction of the pulley support 22 enabling the cable 15 to be extended selectively around either the top or the bottom of the pulley 16 without retracting the cable inwardly beyond the support. This is accomplished by a cantilever arrangement which is capable of withstanding the substantial forces due to tension on the cable while leaving one end of the pulley open around its entire periphery. The cantilever arrangement comprises an elongated generally flat plate 23 having one end secured to the frame tubing 12 and its other end projecting outwardly beyond the tubing and rotatably supporting the pulley on a stub shaft 24 which is secured rigidly to and projects laterally from the plate. Although the plate blocks movement of the cable past one end of the pulley and transversely of the frame into a position between the pulley and the frame, the cantilever support of the plate and stub shaft leaves the other end of the pulley open around its entire periphery to permit the cable to be moved across this end and between the pulley and frame even though the cable extends beyond the pulley.

The support plate 23 herein is stamped from flat steel plate stock and, at its outer end 25 is of circular peripheral contour corresponding to the circular periphery of the pulley 16. To utilize the junction box 17 or conduit 11 to support the pulley end of the puller while permitting free turning of the pulley, the outer end 25 of the plate is of larger diameter than the pulley and thus projects radially beyond the pulley at all points around its periphery. The central portion of the plate between the end portions is straight with parallel edges and the other end portion 26 extends at an obtuse angle with respect to the central portion so as to lie along one flat side of the square frame tubing 12 with the central portion extending upwardly and outwardly at the same angle relative to the tubing. Such angular extension locates the pulley above the tubing and in the same plane so that the cable 15 may be extended from the drum 14 around either the top or the bottom of the pulley without interference. In this instance, the inner end portion of the plate is secured against the tube by welding as indicated at 27 after two locating lugs 28 struck out of the plate are positioned in complementary recesses in the side of the tubing.

Due to the overhang of the pulley 16 and its shaft 24 from one side of the support plate 23, tension on the cable 15 extending around the pulley tends to bend the plate laterally and either toward or away from the plane of the frame tubing depending on whether the cable extends around the top or the bottom of the pulley. To resist such bending, the present invention, in one of its more detailed aspects, contemplates offsetting an elongated section 29 of the central portion of the plate to provide a reinforcing boss. This boss extends substantially the full length of the central portion with its straight side edges paralleling the side edges of the central portion.

The invention also contemplates rotatably mounting the pulley 16 on the stub shaft 24 in a simple and inexpensive manner which facilitates assembly and reduces friction of the parts. The stub shaft thus is formed as a bolt which is extended through an aperture 30 concentric with and formed in the center of the circular end portion 25 of the support plate 23 and lies along the axis of such portion with an enlarged head 31 on one end of the bolt welded flat against the outer side of the plate. The other end portion 32 of the stub shaft is of reduced diameter to form a shoulder 33 facing away from the support plate and providing a stop against which an apertured guard disk 34 is clamped after the pulley is assembled on the shaft. This disk is of the same outer diameter as the circular end portion of the support plate and is clamped against the shoulder simply by threading a nut 35 onto the reduced end portion of the shaft, the inner diameter of the disk being large enough to receive the threaded end portion 32 of the shaft, but smaller than the outer diameter of the shoulder.

Friction between the pulley 16 and its supporting parts preferably is reduced by mounting the pulley on the stub shaft 24 through the medium of a bearing sleeve 36 telescoping over the shaft. Further reduction in friction is achieved by thin washers 37 telescoping over the shaft at opposite ends of the bearing sleeve. The inner diameters of these washers are smaller than the outer periphery of the sleeve so that the sleeve is retained between the washers, the sum of the thicknesses of the washers and the length of the sleeve being less than the spacing of the shoulder from the plate so that, when the guard disk 34 is clamped against the shoulder, the washers, sleeve and pulley are freely rotatable.

It will be apparent that one end of the pulley 16 is free at all points around its periphery to permit the cable 15 to be extended around either the top or bottom of the pulley even when the cable extends beyond the pulley and without retracting the cable. Such ease of operation of the puller is achieved by the cantilever support which, by virtue of the reinforcing boss 29, is capable of withstanding substantial forces due to tension on the cable 15 while utilizing a relatively thin support plate 23 and thereby reducing the amount of metal needed. The guard disk 34, being concentric with and having the same diameter as the circular end portion 25 of the plate and being secured rigidly to the stub shaft 24, cooperates with the plate to permit support of the puller through contact with the junction box 17 or conduit 11 while leaving the pulley freely rotatable. By virtue of the clamping of the disk against the shoulder 33 and the provision of the bearing sleeve 36 and washers 37, the pulley support 22 is simple to assemble and inexpensive to manufacture.

I claim as my invention:

1. A portable wire puller having, in combination, an elongated generally straight frame having one end lying ganerally in a plane, a winding drum mounted on said frame and spaced from said end thereof, a generally flat elongated plate extending along one side of said frame and having one end portion secured to the frame adjacent said one end thereof and its other end portion projecting beyond the frame end, a stub shaft secured rigidly to and projecting laterally from said other end portion of said plate and across said plane and having a shoulder facing outwardly from and spaced from the plate, a guard disk clamped rigidly against said shoulder, said other end portion of said plate and said disk paralleling each other on opposite sides of said plane, a cylindrical bearing sleeve journaled on said shaft between said plate and said disk, two washers journaled on said shaft at opposite ends of said sleeve and each having an inner diameter smaller than the outer diameter of the sleeve, said disk being spaced from said frame end, and a pulley journaled on said sleeve between said washers and within said plane of said frame end and having a size smaller than said end portion of said plate and said guard disk so that the end portion and disk project radially beyond the periphery of the pulley, the central portion of said plate intermediate the plate ends being offset laterally from the plane of the plate to provide a boss to strengthen the plate against lateral bending.

2. A portable wire pulley having, in combination, an elongated generally straight frame, a winding drum mounted on said frame and spaced from one end thereof, a generally flat elongated plate extending longitudinally of said frame and having one end portion secured to the frame adjacent said one end thereof and its other end portion projecting beyond the frame end, a stub shaft secured rigidly to and projecting laterally from said other end portion of said plate, a guard disk secured rigidly to said shaft and disposed parallel to said other end portion of said plate, said disk being spaced from said frame end, and a pulley rotatably mounted on said shaft between said end portion of said plate and said guard disk, the central portion of said plate intermediate the plate ends being offset laterally from the plane of the plate to provide a boss to strengthen the plate against lateral bending.

3. A portable wire puller having, in combination, an elongated generally straight frame, a winding drum mounted on said frame and spaced from one end thereof, a generally elongated support member extending longitudinally of said frame and having one end portion secured to the frame adjacent said one end thereof and its other end portion projecting beyond the frame end, a stub shaft secured rigidly to and projecting laterally from said other end portion of said member and having a shoulder facing away from the member and spaced from the member, a guard disk clamped rigidly against said shoulder and paralleling said other end portion of said member, and a pulley rotatably supported by said shaft and retained thereon by said member and said guard disk, said disk being spaced from said frame end to permit the passage of cable onto and off of the periphery of said pulley.

4. A portable wire puller having, in combination, an elongated generally straight frame, a drum mounted on said frame and spaced from one end thereof, an elongated support member extending longitudinally of said frame and having one end portion secured to the frame adjacent said one end thereof and its other end portion projecting beyond the frame end, a stub shaft secured rigidly to and projecting laterally from said other end portion of said member, a guard element secured rigidly and extending radially from said shaft and spaced from said other end portion of said member, and from said one frame end to permit the passage of a cable longitudinally of the shaft and across the space between the element and frame and a pulley rotatably mounted on said shaft between said member and said element and retained by the element in a plane including said frame end to receive the cable passed through said space between the element and the frame end.

References Cited in the file of this patent

UNITED STATES PATENTS 2,990,160    Foley _____ June 27, 1961